United States Patent [19]
Ritter

[11] Patent Number: 5,077,265
[45] Date of Patent: Dec. 31, 1991

[54] CO-PRECIPITATION SYNTHESIS OF PRECURSORS TO BISMUTH-CONTAINING SUPERCONDUCTORS

[75] Inventor: Joseph J. Ritter, Mt. Airy, Md.

[73] Assignee: The United States of America as represented by the Secretary of Commerce, Washington, D.C.

[21] Appl. No.: 622,155

[22] Filed: Nov. 30, 1990

Related U.S. Application Data

[63] Continuation of Ser. No. 222,856.

[51] Int. Cl.$^5$ .............................................. C01F 11/00
[52] U.S. Cl. ......................................... 505/1; 505/758
[58] Field of Search ................................... 505/1, 758

[56] References Cited

PUBLICATIONS

Maeda et al, Jap. Journal of Applied Physics, pp. L209-210, vol. 27, No. 2, Feb. 88, "A New High Tc Superconductor without a Rare Earth Element".
Uchida et al, Jap. Journal of Appl. Physics, vol. 26, No. 1, 1/1987 pp. L1-L2 "High Tc Superconductivity of La-Ba-Cu-Oxides".
Birol Sonuparlak, "Sol-Gel Processing of Infrared Transparent Mullite", Advanced Ceramic Materials, vol. 3, No. 3, 1988, pp. 263-267.
Joseph J. Ritter, "Modular Magnetically Coupled High-Speed Stirrer for Hermetically Sealed Chemical Reactors", Rev. Sci. Instrum. 59 (2), 2/1988.
R. M. Hazen et al., "Superconductivity in the Very High $T_c$ Bi-Ca-Sr-Cu-O System: Phase Identification", PACS No. 7470 Vy.
A. H. Hamdi et al., "Formation of Thin-Film High $T_c$ Superconductors by Metalorganic Deposition", Appl. Phys. Lett. 51(25), 12/21/87, pp. 2152-2154.
M. K. Wu et al., "Superconductivity at 93 K in a New Mixed-Phase Y-Ba-Cu-O Compound System at Ambient Pressure", Phys. Rev. Lett., vol. 58, No. 9, 3/2/87.
Wang et al., "Comparison of Carbonate, Citrate, and Oxalate Chemical Routes to the High-$T_c$ Metal Oxide Superconductors $La_{2-x}Sr_xCuO_4$", Inorg. Chem. 1987, pp. 1474-1476.
J. G. Bednorz et al., "Possible High $T_c$ Superconductivity in the Ba-La-Cu-O System", Z. Phys. B-Condensed Matter 64, 189-193 (1986).
Xiao-Dong Chen et al., "Practical Preparation of Copper Oxide Superconductors", Rev. Sci. Instrum. 58(9), Sep. 1987, pp. 1565-1571.
David W. Johnson, Jr., "Sol-Gel Processing of Ceramics and Class", Ceramic Bulletin, vol. 64, No. 12, 1985, pp. 1597-1602.
J. M. Tarascon et al., "High-Temperature Superconducting Oxide Synthesis and the Chemical Doping of the Cu-O Planes", 1987 Amer. Chem. Soc., pp. 198-210.
M. Mitchell Waldrop, "Superconductors Hotter Yet", Science, vol. 239, p. 730, Feb. 12, 1988.
M. Mitchell Waldrop, "Thallium Superconductor Reaches 125 K", Science, 3/11/88, Research News 1243.

*Primary Examiner*—William R. Dixon, Jr.
*Assistant Examiner*—Chris Gallo
*Attorney, Agent, or Firm*—James A. Oliff; Stephen G. Adrian

[57] ABSTRACT

A co-precipitation synthesis of precursors to bismuth-containing ceramic superconducting materials is disclosed in which bismuth and at least one other approrpiate metal are dissolved in a non-aqueous acidic solvent, which are then recovered as a homogeneous dry powder. The mixed metal salts are co-precipitated from aqueous solution in the form of the corresponding homogeneous hydroxycarbonate precursor mixture by reaction with either sodium carbonate or potassium carbonate. The homogeneous precursor may be then converted to the $BiCuSrCuO_x$ ceramic by calcining the mixed hydroxycarbonate to a powder, compressing said powder into a green compact, sintering said green compact at a temperature of at least 750° C., and cooling the ceramic material so produced at a controlled rate, preferably about 50° C./minute.

11 Claims, 1 Drawing Sheet

CO-PRECIPITATION SYNTHESIS OF PRECURSORS TO BISMUTH-CONTAINING SUPERCONDUCTORS

This is a continuation of application Ser. No. 07/222,856 filed July 22, 1988 now abandoned.

DESCRIPTION OF THE TECHNICAL FIELD

The present invention relates to a novel process for synthesizing precursors of known bismuth-containing ceramic superconductors. More particularly, the present invention relates to a co-precipitation synthesis of hydroxycarbonate precursors which can then be converted into the $BiCaSrCuO_x$ superconducting material.

The recently discovered "third generation" $BiCaSrCuO_x$ superconducting ceramic materials exhibit a critical superconducting temperature ($T_c$) of about 40° K, with the onset of superconducting beginning at about 80° K.

In addition to critical temperature, superconducting materials are evaluated on the basis of high critical current (i.e., the maximum current density the material can carry before the superconductor fails), a sharp transition from superconducting to non-superconducting properties, and good Meissner effect (i.e., the exclusion of magnetic flux). Still another criterion is the density of the ceramic superconducting material.

The three types of synthesis methods typically employed in the preparation of ceramic oxide superconductors are the solid state reaction method, the co-precipitation method, and the sol-gel synthesis method. The solid-state reaction method generally comprises physically blending the various metallic oxides which form the desired ceramic material into a mixed powder, calcining the mixed powder to remove water and initiate chemical reactions between the oxides, pressing the calcined powder into a compact and calcining the compact further. For oxide systems the solid state reaction method depends on the interdiffusion of metallic atoms and oxygen to produce the ceramic material. Unless the various metallic oxides are in intimate admixture, a single calcining step will produce only an incomplete reaction, and the material must be pulverized, remixed, compacted and recalcined. Because physically mixing the metallic oxides does not typically result in the extremely intimate admixture of the metallic oxides required for successful one-step calcining, several such grinding, mixing, compaction, and calcining cycles may be required before an acceptably homogeneous ceramic material is produced. When a homogeneous material has been produced, it may be mixed with an organic binder (to promote particle cohesion), formed into a shape (green compact) and sintered to fuse the particles into a dense mass.

Co-precipitation of the individual constituents of a desired ceramic material from solution is the second method employed to synthesize ceramic superconductors, and it permits production of green compacts having greater homogeneity. Co-precipitation also provides greater control over the stoichiometry of the ceramic than does the solid state synthesis method. Xiao-Dong Chen et al, "Practical Preparation of Copper Oxide Superconductors," 58 Rev. Sci. Intr. 1565 (1987) describes three co-precipitation synthesis methods (co-precipitation of carbonates, co-precipitation of citrates, and co-precipitation of oxalates). The citrate co-precipitation method is taught to be the preferred synthesis route to the $La_{2-x}Sr_xCuO_4$ superconducting ceramics by Wang et al, "Comparison of Carbonate, Citrate and Oxalate Chemical Routes to the High $T_c$ Metal Oxide Superconductors $La_{2-x}Sr_xO_4$," 26 Inorg. Chem. 1474 (1987). A. Hamdi et al, "Formation of Thin-film High $T_c$ Superconductors by Metalorganic Deposition", 51 App. Phys. Lett. 2152 (1987) report the formation of yttrium, barium and copper neodecanoates, which were dissolved in xylene and pyrimidine to make various chemical combinations, spun coated upon a selected substrate material and cured to remove the organic components and produce a thin film.

The third method is termed sol-gel processing and covers both classical colloidal suspensions of solid particles in a liquid and aqueous solutions of partially hydrolyzed organometallics. The solute is at least partially polymerized into a semi-rigid mass or gell by removal of solvent. The dried gel is then calcined and sintered in much the same manner as the solid state and co-precipitation synthesis routes. Sol-gel processing also offers the advantages of chemical homogeneity on the molecular scale, and may be distinguished from the co-precipitation method by its partial polymerization feature. Tarascon et al, "High Temperature Superconducting Oxide Synthesis And The Chemical Doping of the Cu-O Planes," *Chemistry of High Temperature Superconductors* at 198 (A.C.S. 1987) teaches that a sol-gel synthesis of $YBa_2Cu_3O_{7-y}$ superconducting ceramics produces the most homogeneous and dense ceramics with the sharpest superconducting transitions.

It is believed the co-precipitation and sol-gel processing synthesis routes have not been applied to bismuth containing ceramic $BiCaSrCuO_x$ ceramic materials because of the water insolubility of commonly available bismuth salts. A requirement for both synthesis routes is a solvent or a procedure by which an intimate admixture of the elements can be achieved. Without such an intimate admixture a superior superconducting ceramic will not be obtained.

An object of the present invention is to provide a co-precipitation synthesis of precursors to the $BiCaSrCuO_x$ superconducting material which permits the manufacture of homogeneous $BiCaSrCuO_x$ ceramic superconductors.

BRIEF SUMMARY OF THE INVENTION

In one aspect, the present invention relates to a co-precipitation process for synthesizing precursors of bismuth-containing ceramic superconducting materials comprising:

forming a solution of bismuth and at least one other metal in acidic non-aqueous solvent;

removing the non-aqueous solvent, thereby forming a homogeneous residue of mixed metal salts; and co-precipitating the mixed metal salts from aqueous solution in the form of hydroxycarbonates.

In another aspect, the present invention relates to a process for synthesizing bismuth-containing ceramic material comprising:

forming a solution of bismuth and at least one other metal in an acidic non-aqueous solvent;

removing the non-aqueous solvent, thereby forming a homogeneous residue of mixed metal salts;

co-precipitating the mixed metal salts from aqueous suspension in the form of hydroxycarbonates;

calcining the hydroxycarbonates to a powder;

compressing said powder into a green compact;

sintering said green compact at a temperature of at least 750° C., thereby forming a ceramic material; and cooling said ceramic material at a rate of from about 40° C./minute to about 60° C./minute.

BRIEF DESCRIPTION OF THE DRAWING

The Figure is a graph of magnetic susceptibility vs. temperature for (a) a bismuth-containing ceramic material produced from a precursor material produced according to the co-precipitation process of the present invention and (b) a corresponding bismuth-containing ceramic material produced by a solid state synthesis route.

DETAILED DESCRIPTION OF THE PREFERRED EMBODIMENTS

Figure 1:
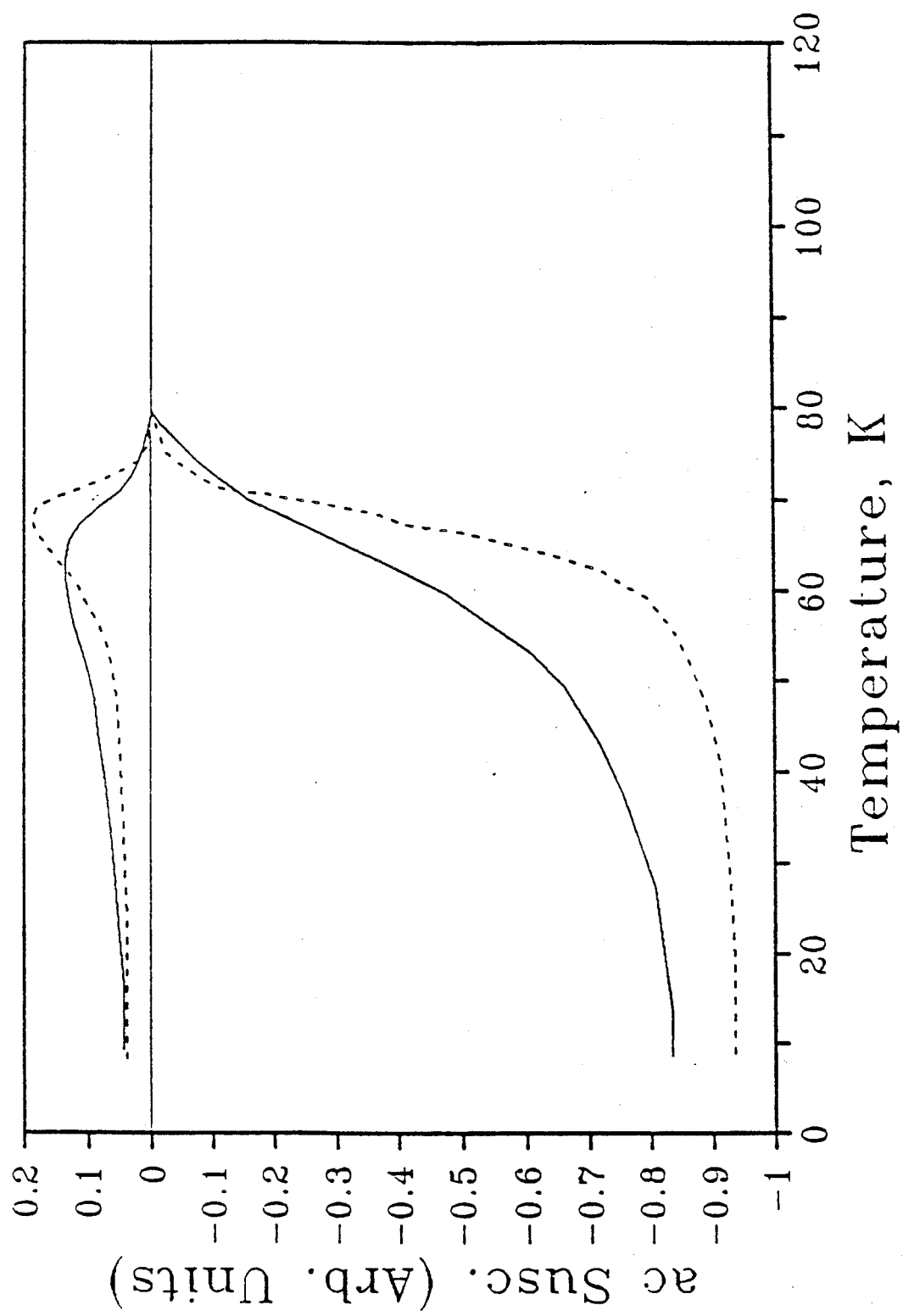

As summarized above, the present invention relates to a co-precipitation process for synthesizing homogeneous precursors to bismuth-containing ceramics, and particularly to the "third generation" $BiCaSrCuO_x$ superconducting materials. The first step comprises forming a homogeneous solution of bismuth and of at least one other appropriate metal in a suitable acidic non-aqueous solvent such as glacial acetic acid, thereby producing an intimate blend of the corresponding metal salts.

In addition to bismuth, the metals of interest will typically be those elements which are known to form superconducting ceramic materials with bismuth, and will include calcium, barium, strontium, copper, aluminum, yttrium and the lanthanides.

Suitable acidic non-aqueous solvents are those solvents in which the appropriate metals are mutually soluble, and may be easily empirically determined. It is believed that the lower arboxylic acids are suitable solvents. Glacial acetic acid is preferred.

The second step comprises removing the non-aqueous solvent, thereby forming a homogeneous residue of the mixed metal salts. Solvent removal may be performed by well known and conventional methods such as by heating. The solvent is preferably recovered and reused. The homogeneous mixed metal salts residue is typically a dry powder in which the metal salts are in intimate admixture with one another.

The powdery residue is then converted into the corresponding mixed hydroxycarbonates, preferably by reaction with either potassium carbonate or sodium carbonate in aqueous solution at 25° C. High speed agitation of the reaction mixture may be employed to ensure complete reaction and better homogeneity. The mixed hydroxycarbonates co-precipitate out of solution, and may be recovered by centrifugation, washing with water, and drying.

The co-precipitate so prepared comprises a homogeneous mixture of metallic hydroxycarbonates in intimate contact with one another. This co-precipitate is ready for calcining and sintering without further blending, mixing or other homogenization. The above described process thus provides a homogeneous bismuth-containing ceramic precursor powder without the need for expensive and tedious high temperature homogenization by repetitive recalcining.

It is necessary to first dissolve the bismuth and the appropriate metals in the non-aqueous solvent in order to achieve a homogeneous admixture of the metals. Attempts to calcine the mixed-metal acetate mixture directly results in the loss of significant amounts of Bi as $Bi_2O_3$ at temperatures around 500°–800° C. The precipitated mixed-metal hydroxycarbonates do not suffer from this disadvantage over a similar temperature range. Moreover, simply creating a co-suspension of appropriate metal compounds in aqueous solution by means of high speed agitation will not produce a sufficiently homogeneous bismuth-containing precursor.

The present invention also includes the conversion of the mixed hydroxycarbonates precursor to the superconducting $BiCaSrCuO_x$ ceramic material. This may be accomplished by calcining the powder to remove moisture and any organic material, pressing the calcined powder into a green compact, sintering the green compact in air, and cooling the resulting ceramic at a controlled rate.

The optimum sintering temperature and time may be easily empirically determined by one of ordinary skill in the art. Generally, the sintering temperature should not exceed the melting point of the green compact, but should be as close to the melting point as possible in order to promote a high degree of ordering (i.e. single crystalline phase). The optimum sintering time is the shortest time which will produce a ceramic without transient phases. A sintering time of 60 hours at 800° C. is an illustrative example of a possible sintering process.

It is known that controlled, relatively slow cooling of the sintered superconductor in the presence of oxygen will produce a ceramic having a sharp and narrow transition width compared to a similar ceramic which has been "quenched" or rapidly cooled. A cooling rate of from about 40° to 60° C./minute, preferably 50° C./minute, may be employed.

EXAMPLES

The following examples are illustrative embodiments of the generic invention; in no event are they intended to limit the scope of the invention.

EXAMPLE I

Preparation of A Mixed Hydroxycarbonate Precursor

Two millimoles each of bismuth subacetate and strontium carbonate were dissolved in about 100 milliliters of glacial acetic acid with heat and stirring. After several hours, a clear solution was obtained and 2 millimoles of calcium acetate plus 4 millimoles of cupric acetate were added, thereby imparting a clear deep blue color to the solution. This final solution was evaporated to dryness, and the resultant blue powder dried at 120° C. for about 4 hours. The dried powder was dispersed in about 100 milliliters of $H_2O$ employing a high speed homogenizer. Twenty milliliters of 0.9M $K_2CO_3$ solution was added. Homogenization was continued for an additional 15 minutes, after which the light green precipitate was separated by centrifugation, washed 4 times with 10 milliliter portions of water and dried for 18 hours at 120° C. X-ray powder diffraction (XRPD) analysis of the dried light green precursor powder indicated that the material was essentially amorphous.

EXAMPLE II

Conversion of A Mixed Hydroxycarbonate Precursor to A Superconducting Material

Calcining the material prepared in Example I at 435° C. for 14 hours yielded a brown powder whose XRPD showed $Bi_2CuO_4$ plus other, as yet, unidentified phases. The powder was then dry pressed at 17.5 MPa into green compacts (two 13 mm × 2 mm thick discs). The discs were stacked on a gold substrate, fired in air at 750° for 18 hours, then at 800° C. for 60 hours, and cooled at rate of 50°/min producing material which presumably has the composition BiCaSrCu$_2$O$_x$. Samples of sintered materials, typically 6 mm long, 3 mm wide, and 1 mm thick weighing approximately 60 mg, were used for magnetic measurements. AC susceptibility was measured in a Hartshorn-type bridge with an applied ac field of about 40 A/m (0.5 Oe) at a frequency of 1.68 kHz, both with no externally applied DC field and with an externally applied transverse DC field of 10$^4$ A/m (126 Oe). An hysteresis loop was obtained in a vibrating sample magnetometer.

The pressed discs fired at 750° underwent sintering and indicated an increase in density from 2.7 to 4.9 g/cc, but exhibited practically no Meissner effect. After a subsequent firing at 800°, the onset of a significant change in the ac magnetic susceptibility was detected at 80K, demonstrating the transition to superconductivity.

EXAMPLE III

Solid State Synthesis Comparative Example Illustrating BiSrCaCu$_2$O$_x$ Superconducting Ceramics Ceramic samples with molar ratios of Bi:Sr:Ca:Cu=1:1:1:2 were prepared from Bi$_2$O$_3$, SrCO$_3$, CaCO$_3$ and CuO starting powders. After homogeneously mixing the dry starting powders, samples were uniaxially pressed at 70 MPa to form 12.5 mm diameter green compacts of 2 mm thickness. In order to prevent contamination from the Pt setter foil used, the green compacts were placed on pressed pellets of the same composition. The green compacts were then sintered in open crucibles in air for 15 hours at 795° C., and then 12 hours at 870°C. (There may be some loss of bismuth in this step.) After sintering, the ceramics were furnace cooled at a rate of about 200° C. per hour.

AC susceptibility measurements of both the chemically prepared material and the material prepared by solid-state reaction are depicted in FIG. 1. The dotted line represents the bismuth-containing ceramic produced by the co-precipitation process of the present invention, while the solid line represents the bismuth-containing ceramic produced by the solid state method summarized in Example III. The bismuth-containing ceramic produced by co-precipitation displays a significantly sharper transition from its superconducting onset temperature to its critical temperature than does the solid state ceramic.

It is obvious that a variety of bismuth-containing compositions can be synthesized by the method described. While a combination of bismuth, calcium and copper acetates plus strontium carbonate was employed in the above Examples, it is reasonable to project that the less expensive carbonates of these materials could also be used.

As discussed above, precursor powders prepared conventionally by physically blending the appropriate oxides and carbonates tend to sinter poorly at 750° due to large particle sizes and insufficient homogeneity. Thus, the co-precipitation synthesis of bismuth containing ceramics, particularly the BiCaSrCuO$_x$ superconductor system herein described, offers the advantages of 1) inexpensive raw materials 2) synthesis at modest temperatures without special precautions 3) homogeneous reactive powders which sinter readily 4) a chemical system amenable to continuous powder production.

I claim:

1. A co-precipitation process for synthesizing precursors of bismuth-containing ceramic superconducting materials, comprising:
   forming a solution of bismuth and at least one other metal in an acidic non-aqueous solvent;
   removing the non-aqueous solvent, thereby forming a homogeneous residue of mixed metal salts;
   co-precipitating the mixed metal salts from aqueous solution in the form of hydroxycarbonates such that upon calcination and heat treatment, said precursors can form a superconducting material.

2. The process of claim 1 wherein the acidic non-aqueous solvent employed to form said solution of bismuth and at least one other metal is a lower carboxylic acid.

3. The process of claim 2 wherein said lower carboxylic acid is glacial acetic acid.

4. The process of claim 1 wherein said metal is selected from the group consisting of calcium, strontium, copper, aluminum, yttrium, barium and the lanthanides.

5. The process of claim 1 wherein the non-aqueous solvent is removed by application of heat.

6. The process of claim 1 wherein the mixed metal salts are co-precipitated to hydroxycarbonates by reaction with a carbonate selected from the group consisting of potassium carbonate and sodium carbonate.

7. A process for synthesizing superconducting ceramic material comprising:
   forming a solution of bismuth and at least one other metal in an acidic non-aqueous solvent;
   removing the non-aqueous solvent, thereby forming a homogeneous residue of mixed metal salts;
   co-precipitating the mixed metal salts from aqueous suspension in the form of hydroxycarbonates;
   calcining the hydroxycarbonates to a powder;
   compressing said powder into a green compact;
   sintering said green compact at a temperature of at least 750° C., thereby forming a ceramic material;
   cooling said ceramic material at a rate of from about 40° C./minute to about 60° C./minute to form a superconducting material.

8. The process of claim 7 wherein said metal is selected from the group consisting of calcium, strontium and copper.

9. The process of claim 7 wherein said process prouces BiCaSrCuO$_x$ ceramic material.

10. The process of claim 7 wherein said ceramic material is cooled at a rate of about 50° C./minute.

11. A co-precipitation process for synthesizing precursors of a Bi-Sr-Ca-Cu-O ceramic superconducting material, comprising:
    forming a solution of bismuth, strontium, calcium and copper precursors in an acidic non-aqueous solvent;
    removing the non-aqueous solvent, thereby forming a homogeneous residue of mixed metal salts;
    co-precipitating the mixed metal salts from aqueous solution in the form of hydroxycarbonates such that upon calcination and heat treatment, said precursors can form a superconducting material.

* * * * *